Patented July 11, 1933

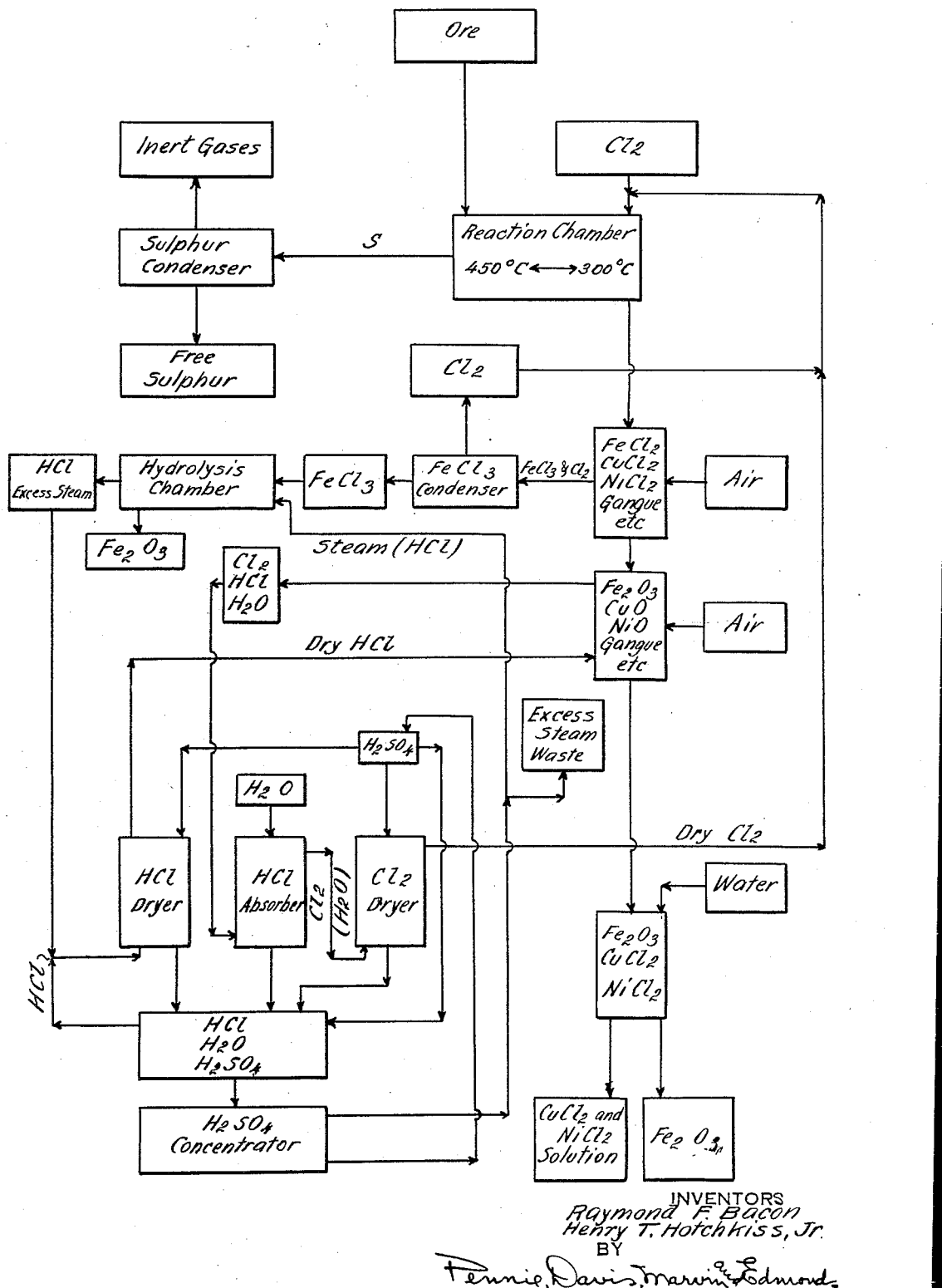

1,917,789

UNITED STATES PATENT OFFICE

RAYMOND F. BACON, OF BRONXVILLE, AND HENRY T. HOTCHKISS, JR., OF NEW ROCHELLE, NEW YORK; SAID HOTCHKISS, JR., ASSIGNOR TO SAID BACON

RECOVERY OF SULPHUR AND IRON OXIDE

Application filed February 26, 1930. Serial No. 431,469.

This invention relates to the recovery of sulphur and has for an object the provision of an improved process for recovering sulphur from heavy metal sulphide ores. More particularly, the invention contemplates the provision of an improved process for recovering sulphur from materials containing one or more sulphides of iron. The invention further contemplates the provision of an improved process for treating heavy metal sulphide ores such, for example, as ore containing sulphides of iron, copper and nickel.

The process of the present invention involves the treatment of ore or other metallurgical raw materials or products containing pyrites or other sulphides of iron, alone or in combination with sulphides of other heavy metals such, for example, as copper and nickel, with a chlorinating agent such as chlorine, sulphur chloride or sulphuryl chloride for the purpose of obtaining free sulphur and/or separating iron from the mass of material undergoing treatment.

In carrying out a process in accordance with the present invention, a quantity of the material to be treated is subjected to the action of a chlorinating agent under such conditions that free sulphur and ferrous chloride are produced. The operation is so conducted that the sulphur produced is vaporized, leaving a residue containing the ferrous chloride together with chlorides of other heavy metals such as copper and nickel when the sulphides of such metals are present in the material being treated. The solid residue is treated to produce chlorine and ferric chloride and convert the ferrous chloride and heavy metal chlorides to oxides. The ferric chloride is treated to produce hydrogen chloride. The hydrogen chloride is subjected to the action of air in the presence of the iron oxide to produce chlorine which is returned to the process.

The invention will be better understood from a consideration of the accompanying flowsheet and the following description of the application of the process to the treatment of ore containing pyrites and sulphides of copper and nickel with chlorine.

The ore to be treated is subjected to the action of chlorine under such conditons that ferrous chloride and free sulphur are produced. The operation is so conducted that the sulphur produced is vaporized, leaving a residue containing the ferrous chloride together with the chlorides of copper and nickel. The sulphur may be vaporized by means of inert gases introduced with the chlorine or a temperature sufficiently high to vaporize the sulphur may be maintained and substantially pure chlorine gas may be employed. The invention contemplates the recovery of chlorine during the course of the process. The chlorine when first recovered may be mixed with inert gases, and the mixture of gases may be introduced into the chlorinating chamber. When the mixture is used, the reaction chamber may be maintained at a temperature above or below the boiling point of sulphur. At either or both temperatures, the reaction may be so controlled that inert gases aid in sweeping the sulphur from the reaction chamber. A temperature of about 300° C. to 350° C. may be maintained throughout the entire reaction chamber.

The ore is preferably introduced in a dry, finely divided condition into the interior of a rotary reaction chamber having ore charging means at one end and discharging means at the other end, and which is so constructed and operated that the ore is gradually moved from the charging end toward the discharge end. Chlorine gas alone or mixed with other gases is introduced into the reaction chamber at the end opposite to that at which the ore is introduced and the ore and sulphur chloride pass through the reaction chamber in counter-current relationship. The ore preferably ground to provide particles sufficiently small to pass a 100-mesh screen in order that intimate contact of the sulphur chloride with the sulphide particles may be obtained.

The process is preferably so controlled that a temperature of about 450° C. is maintained near the ore charging end of the reaction chamber, and a temperature of about 300° C. to 350° C. is maintained near the discharge end of the reaction chamber. The chlorine in any desired concentration and at any desired temperature is introduced into a portion of the reaction chamber which is maintained at a temperature of about 300° C. to 350° C. The chlorine and the metal sulphides react to produce elemental sulphur, ferrous chloride and the chlorides of copper and nickel. The admission of ore and chlorine is preferably so regulated that all of the sulphur liberated is vaporized as elemental sulphur, all of the chlorine admitted is consumed, and substantially all of the iron sulphide is converted to ferrous chloride.

Any ferric chloride which is produced in the reaction chamber will be vaporized and swept along with the incoming chlorine to meet the entering iron sulphide-bearing material. The ferric chloride will react with the sulphides to form ferrous chloride and sulphur chloride. Sulphur chloride which is formed will also react with the heavy metal sulphides. The reaction between the sulphides and the chlorine is exothermic and the desired temperatures may be maintained by the heat developed.

The sulphur produced is vaporized and separated from the heavy metal chlorides in the hottest portion of the reaction chamber, and the residue containing the heavy metal chlorides is discharged from the reaction chamber at a temperature of about 300° C. to 350° C. The vaporized sulphur is collected and condensed.

The residue containing the ferrous chloride and the chlorides of copper and nickel is heated in the presence of air to a temperature of about 300° C. to 450° C. to form ferric chloride and produce ferric oxide and oxides of copper and nickel. The operation is so conducted that the ferric chloride is vaporized. The resulting gases will contain some inert gases and chlorine as well as ferric chloride. The gases are collected and cooled to condense the ferric chloride and separate the chlorine and inert gases. The treatment of the ferrous chloride-bearing material is preferably conducted in a rotary reaction chamber which is so constructed and arranged that ferrous chloride-bearing material charged into one end portion will move progressively toward the other end portion during its rotation.

The condensed ferric chloride is vaporized and subjected to the action of water vapor at an elevated temperature in a suitable reaction chamber. The ferric chloride is hydrolyzed and ferric oxide and hydrogen chloride are formed, the reaction proceeding according to the following equation:

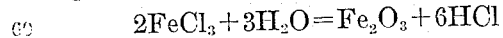

$$2FeCl_3 + 3H_2O = Fe_2O_3 + 6HCl$$

In carrying out the hydrolysis of ferric chloride, ferric chloride vapor and superheated steam are introduced together into the reaction chamber in such a manner that intimate mixing will result. The reaction may be conducted conveniently at a temperature of about 300° C. to 400° C. Good results may be obtained if the reaction chamber is maintained at a temperature of about 350° C.

The ferric oxide will be produced in the form of a fine powder which may be permitted to settle out in the reaction chamber. The gases issuing from the chamber contain hydrogen chloride and water vapor and they are passed through a suitable drying apparatus such, for example, as a packed tower having sulphuric acid trickling therethrough to separate the water vapor and produce dry hydrogen chloride.

The dry hydrogen chloride is introduced into a catalytic reaction chamber containing the heavy metal oxides produced with one to seven times its volume of air, depending on the concentration of the hydrogen chloride available. The air is preheated to a temperature above 420° C. and preferably to a temperature between 520° C. and 530° C. If desired, the hydrogen chloride may also be preheated. The ferric oxide and/or other oxides serve as catalysts for promoting a reaction between the hydrogen chloride and the oxygen of the air.

The catalytic reaction chamber may consist of a tower, or a series of communicating towers packed with porous material having a very large surface per unit of volume such, for example, as pumice, brick, cinders and the like. The packing material should be of such a nature that it will be inert to the reagents and the products of the reaction. The packing material is covered, mixed or impregnated with the heavy metal oxides which promote a reaction between hydrogen chloride and oxygen. Means are provided for renewing the catalytic mass as its efficiency becomes reduced. For this purpose two towers, or two series of communicating towers, which may be used alternately are preferably provided.

The apparatus is so constructed that the mass of catalyst bearing material may be maintained at a temperature of from 370° C. to 400° C. The reaction between the hydrogen chloride and the oxygen of the air is exothermic and it may be so controlled as to permit the proper temperature to be maintained. The reaction will proceed at a temperature as low as 205° C., and a temperature as high as 470° C. may be used advantageously. The reaction involved in this operation does not proceed to completion. The gases issuing from the reaction chamber will consist of a mixture of hydrogen chloride, water vapor and chlorine.

In view of the fact that the reaction does not readily proceed to completion, it may be desirable to retreat the issuing gases by subjecting them to a drying operation to remove the water vapor and subsequently passing them through a second reaction chamber.

This procedure may be repeated two or three or more times if desired. In carrying out the reaction between hydrogen chloride and the oxygen of air it is advisable to carefully control the proportions of air and hydrogen chloride utilized in order to avoid excessive dilution of the resulting chlorine gas and in order to avoid the incorporation of excessive amounts of free oxygen in the resulting chlorine gas.

The gases are washed with water to separate the chlorine and hydrogen chloride. The separated chlorine is dried with sulphuric acid.

The chlorine recovered during the treatment of the heavy metal chlorides with air and the chlorine resulting from the reaction of hydrogen chloride with oxygen are returned to the process for the treatment of additional ore.

The sulphuric acid used for drying the hydrogen chloride and chlorine is combined with the water used for separating the hydrogen chloride and chlorine and the resulting liquid is heated to recover hydrogen chloride which is returned to the process. The sulphuric acid which has been freed from hydrogen chloride is concentrated and again used for drying purposes. A portion of the steam produced in concentrating the sulphuric acid is utilized for treating the ferric chloride. The first fractions obtained during the concentration of the sulphuric acid will contain hydrogen chloride and the use of these fractions in providing superheated steam for treating the ferric chloride will permit an added recovery of chlorine.

As a result of the treatment of the hydrogen chloride and ferrous-chloride bearing material with air, considerable quantities of inert gases, such as nitrogen, are introduced into the system and must be eliminated to avoid excessive dilution. The inert gases will be mixed with the chlorine gas which is recovered, and consequently, they will be returned to the system during the treatment of original ore. Elimination of these gases is effected by condensing the vaporized sulphur.

The hydrogen chloride passing through the catalytic reaction chamber converts the oxides of nickel and chloride contained therein to the corresponding chlorides. The resulting mass containing ferric oxide and copper and nickel chlorides is leached with water to dissolve the chlorides and separate the ferric oxide. The resulting solution of copper and nickel chlorides may be treated in any desired manner to recover the copper and nickel.

The process may be conducted continuously. A source of fresh chlorine is provided to compensate for chlorine losses due to leakage and the production of nickel and copper chlorides. The fresh chlorine may be supplied as chlorine gas or hydrogen chloride and the choice will be determined by the relative costs.

The principal reactions involved in the process are exothermic and enough heat is provided that no heat need be supplied from outside sources. Heat generated during the course of the process may be utilized for carrying out the concentration of the sulphuric acid, vaporization of ferric chloride and other operations in which temperatures must be increased.

We claim:

1. In a process for recovering sulphur from iron sulphide-bearing material, the improvement which comprises subjecting the material to the action of a chlorinating agent in such amount as to produce ferrous chloride and elemental sulphur at a temperature sufficiently elevated to vaporize the sulphur, subjecting the ferrous chloride to the action of air to form ferric chloride and ferric oxide, hydrolyzing the ferric chloride to form hydrogen chloride, subjecting the hydrogen chloride to the action of air in the presence of ferric oxide resulting from the treatment of the ferrous chloride with air to obtain chlorine, and returning the chlorine to the process for the treatment of additional iron sulphide-bearing material.

2. The method of treating iron sulphide bearing material which comprises subjecting the material to the action of chlorine in such amount as to produce ferrous chloride and elemental sulphur at a temperature sufficiently elevated to vaporize the sulphur, subjecting the ferrous chloride to the action of air to form ferric chloride and ferric oxide, hydrolyzing the ferric chloride to form hydrogen chloride, subjecting the hydrogen chloride to the action of air in the presence of the ferric oxide resulting from the treatment of the ferrous chloride with air to obtain chlorine, and returning the chlorine thus produced to the process for reaction with additional iron sulphide-bearing material.

3. The method of treating iron sulphide-bearing material which comprises subjecting the material to the action of chlorine in such amount as to produce ferrous chloride and elemental sulphur at a temperature sufficiently elevated to vaporize the sulphur, subjecting the ferrous chloride to the action of air to form ferric chloride and ferric oxide, subjecting the ferric chloride to the action of superheated steam to produce hydrogen chloride, subjecting the hydrogen chloride to the action of air in the presence of the ferric oxide resulting from the treatment of the ferrous chloride with air to obtain chlorine, and returning the chlorine thus produced to the process for reaction with additional iron sulphide-bearing material.

4. The method of treating iron sulphide-bearing material which comprises subjecting the material to the action of chlorine in such amount as to produce ferrous chloride and elemental sulphur at a temperature sufficiently elevated to vaporize the sulphur, subjecting the ferrous chloride to the action of air to form ferric oxide and to form and vaporize ferric chloride, condensing the ferric chloride vapors to eliminate inert gases and any chlorine gas mixed therewith, hydrolyzing the ferric chloride to form hydrogen chloride, subjecting the hydrogen chloride to the action of air in the presence of the ferric oxide resulting from the treatment of the ferrous chloride with air to obtain chlorine, and returning the chlorine thus produced to the process for reaction with additional iron sulphide-bearing material.

5. The method of treating ore containing pyrites and sulphides of copper and nickel which comprises subjecting the ore to the action of a chlorinating agent in such amount as to produce a product containing ferrous chloride and chlorides of copper and nickel, subjecting the product thus formed to the action of air at an elevated temperature to form ferric chloride and oxides of iron, copper and nickel, hydrolyzing the ferric chloride to form hydrogen chloride, subjecting the hydrogen chloride to the action of air in the presence of the oxides of iron, copper and nickel resulting from the treatment of the ferrous chloride-bearing product with air to recover chlorine, and returning the chlorine thus recovered to the process for the treatment of additional ore.

In testimony whereof we affix our signatures.

RAYMOND F. BACON.
HENRY T. HOTCHKISS, Jr.